Patented Jan. 16, 1945

2,367,375

UNITED STATES PATENT OFFICE 2,367,375

SEALING COMPOSITION

Laurence L. Rector, Fort Worth, and Charles L. Cron, Houston, Tex.

No Drawing. Application March 10, 1941,
Serial No. 382,572

14 Claims. (Cl. 106—171)

This invention relates to new and useful improvements in sealing compositions.

This application is filed as a continuation-in-part of our co-pending application, Serial No. 281,828, filed June 29, 1939.

One object of the invention is to provide an improved sealing composition for sealing contacting metallic surfaces or joints and being particularly adapted for use in sealing screw-threaded joints, whereby leakage past the joint is prevented; the composition also being applicable to gaskets, or other sealing elements for enhancing their sealing efficiency.

A particular object of the invention is to provide an improved sealing composition which is waterproof and is also unaffected by petroleum, or any of its fractions, and which will maintain its sealing qualities under the action of salt water, dilute acids, and other corrosives occurring in crude oil, thereby making it particularly useful in the petroleum industry, although it may be used elsewhere.

An important object of the invention is to provide an improved sealing composition having a consistency which facilitates its application to a metallic or other surface and which, after standing, sets in a soft pliable mass which maintains elasticity and mobility to a degree, whereby it never hardens to a brittle stage and, therefore, does not interfere with the breaking of the joint at any time after application of the composition, regardless of the length of time that said composition may have been applied.

Another object of the invention is to provide an improved sealing composition or compound having excellent lubricating qualities whereby frictional heat, incidental to making up the joint, is substantially eliminated; the composition also being such that after application, a protective film of lubricant exudes from the composition to form a coating of lubricant between the surface of the composition and the surface of the metal to which it is applied, whereby "breaking" or disconnection of the joint is facilitated.

A further object of the invention is to provide an improved sealing composition consisting of cellulose derivative solution admixed with a solution softener, such as a vegetable oil, and an inert mineral filler, the constituents being in such proportions as to produce a substance having a relatively thick flowing consistency, whereby the composition may be readily applied to a surface by means of a brush or swab.

Another object of the invention is to provide a composition, of the character described, which includes a base solution consisting of a cellulose derivative dissolved in a group of liquid solvents, such as esters and ketones, the solvents having boiling points which vary from low to high over a given range, whereby when evaporation occurs, the rate of evaporation is uniform and gradual, with the result that the composition changes from its original free flowing consistency to a plastic mass which will not flow of its own accord or under considerable pressure, and the solution will not become dry or brittle because of evaporation, as would be the case if only one solvent of a low boiling point was employed.

A still further object of the invention is to provide an improved sealing composition wherein the base solution has a softener or plasticizer admixed therewith in excessive amounts; that is, the amount of plasticizer exceeds the retentivity point of the final state of the composition, whereby upon standing or aging, the excess plasticizer will slowly exude from the composition to provide a protective film of lubricant on the surface of said composition, the lubricant being desirable particularly when the composition is employed on screw-threaded joints.

In producing the improved composition, any derivative of cellulose, such as a salt (cellulose nitrate), an organic ester (cellulose acetate) or an ether (ethyl cellulose or benzyl cellulose) is employed. For the purpose of this description, cellulose nitrate, which is also known as nitrocellulose, will be used, but it is to be understood that any derivative of cellulose may be substituted therefor.

The cellulose nitrate is dissolved in a liquid solvent or group of solvents, the dissolution being effected during thorough agitation or mixing. The liquid solvents may be esters and ketones, which vary in boiling points over a relatively wide range, as for example, from 80 degrees F. to 300 degrees F. As explained, the cellulose nitrate is dissolved in this group of solvents to form a base solution and the proportion of the cellulose derivative to the solvents is such that said solution has body, but is quite mobile, being capable of flowing. It has been found that a base solution containing about twelve per cent of the cellulose derivative has a suitable consistency, but the invention is not to be limited to this figure as the proportions may vary without defeating the purpose of the invention.

The base solution so formed is made up of a cellulose derivative in solution in a series of solvents. This series of solvents ranges in boiling points from a fairly low temperature, 50 to 100 degrees F., to a fairly high temperature, 200 to 400 degrees F. These temperature ranges are stated merely to give an idea of the range and may be varied at will. The composition is originally made up with these various solvents and has the consistency of heavy grease. It may be applied with a brush or swab and spreads easily over the joint to be protected. As the composition stands in the joint the lighter solvents, or solvents having the lower boiling points, will evaporate from the composition allowing it to harden somewhat. However, the solvents present that have a high boiling point will not evaporate even under considerable heat, and they maintain the composition in an elastic and plastic condition. It will be seen that the final or terminal consistency of the composition may be determined beforehand by varying the proportions of the lighter and the heavier solvents. Also, it is obvious that the composition will not become caked or brittle, but will be held in an elastic condition indefinitely by the action of the high boiling solvents. The elasticity of the compound is not sufficient as to allow it to flow of its own accord or under pressure, but it is sufficient as to prevent the compound from caking or chipping under conditions of vibration. The higher boiling solvents used are preferably non-soluble in petroleum or its fractions. Thereby, the compound may not be dissolved or disintegrated by said petroleum, and is ideal for use in oil well tubing and casing and machinery joints.

The base solution, consisting of the cellulose nitrate and the group of solvents, is then admixed with a plasticizer or softener, the latter being preferably added to the solution while stirring. The plasticizer or softener is one of very low solubility in petroleum hydrocarbons and one which is non-drying and has lubricating qualities. It has been found that a vegetable oil, and particularly castor oil, is suitable. Castor oil is non-drying, has high lubricating qualities, is of low solubility in petroleum hydrocarbons, and is compatible in limited proportions with cellulose nitrate. If added suddenly to the base solution, castor oil might result in curdling or precipitating the cellulose nitrate and, therefore, to avoid this, it is desirable that the castor oil be added slowly and with stirring. It is pointed out that the invention is not to be limited to castor oil and any softener or plasticizer having similar characteristics may be employed instead.

Castor oil might be termed a non-solvent plasticizer for nitrocellulose. In other words, the nitrocellulose is capable of absorbing or uniting with limited amounts of castor oil in a homogeneous mixture. However, after the retentivity point of the cellulose for the castor oil has been reached, additional castor oil will not enter into the homogeneous mixture, but will remain in a separate phase, so that a heterogeneous mixture results. It has been found that the retentivity point of nitrocellulose for castor oil is reached when approximately five times as much castor oil as nitrocellulose, by weight, has been added to the nitrocellulose. Thus, castor oil in excess of this amount may not be retained by the nitrocellulose in a homogeneous phase.

The solvents added to the nitrocellulose will retain the castor oil which has been added in excess of the retentivity of the nitrocellulose. However, after the composition has set, and the solvents have partially evaporated, no ingredient remains to retain the castor oil so that it separates and exudes slowly from the mass of the composition. Any softener used in this composition is used in such amounts as to exceed the retentivity point of the particular cellulose derivative for that softener.

The oil or softener is added to the base solution preferably in an amount equal in weight to the weight of the base solution, although these proportions may vary. When added in an amount equal in weight to the weight of the base solution, a ratio of softener or oil to the cellulose nitrate of approximately eight to one exists, but it is pointed out that this figure is illustrative only. Although the exact amount of softener or plasticizer which is added to the base solution is subject to variation, it is desirable that sufficient softener or plasticizer be added so as to exceed the point of retentivity of the cellulose nitrate. Thus, when the mixture is allowed to stand, the softener or plasticizer slowly exudes from the mixture. This exuding plasticizer, which is the vegetable oil, forms a thin protective film on the outer surface of the compound, as will be more fully explained. The excess plasticizer is carried in the composition in minute particles much as the oil is carried in a stable oil-water emulsion. This suspension is very stable and the plasticizer does not commence to exude or "sweat out" of the composition until the composition has lost part of its solvents by evaporation and has hardened to its final state. The addition of the vegetable oil does not materially change the consistency of the original base solution and functions in the compound to prevent drying beyond a given or predetermined point and also functions as a lubricant.

After the base solution and softener or plasticizer (castor oil) are admixed, a suitable bulking agent, such as a mineral filler, is added. The filler is inert, insoluble in water, petroleum, salt water and dilute acids. The filler is preferably added in amounts sufficient to give the mixture a thick consistency substantially that of molasses. It has been found that such consistency is obtained by adding the filler in amounts equal to from fifty to eighty per cent of the total weight of the liquid, depending upon the density of the filler used. Although any suitable mineral filler may be employed, a filler, such as "asbestine," clay, graphite, talc, or the like, may be employed. It is preferable that the filler be finely ground so as to give the mixture a smooth texture. The viscosity and specific gravity of the mixture is controlled by the amount and specific gravity of the filler. A mineral filler has been found entirely satisfactory, but other equivalent fillers capable of the same function in the composition, such as wood pulp, could be used. The mixture has a consistency substantially that of molasses and is readily applied to a metal, or other surface, with a swab or brush.

In order to prevent the mineral from settling in the liquid during storage, a suitable suspending agent, such as aluminum stearate, magnesium linolenate, or the like, may be added, although this is not essential. Also, if desired, resin may be added to add body and adhesiveness to the composition; the resin also aids the compatibility of the cellulose nitrate for the softener or plasticizer. The resin should be one insoluble in petroleum, as for example, shellac.

Examples illustrating the invention follow:

Example I

| | Parts by weight | Percent |
|---|---|---|
| Ingredients of composition after setting: | | |
| Cellulose ester | 1 | 5.7 |
| Limited solubility plasticizer | 5 | 27.7 |
| Filler | 6 | 33.3 |
| Volatile portion of composition: | | |
| Liquid solvents (esters, ketones) | 6 | 33.3 |
| | | 100.0 |

Example II

| | Parts by weight | Percent |
|---|---|---|
| Ingredients of composition after setting: | | |
| Cellulose nitrate | 1 | 5.7 |
| Castor oil | 5 | 27.7 |
| Filler | 6 | 33.3 |
| Volatile portion of composition: | | |
| Ethyl acetate | 6 | 33.3 |
| | | 100.0 |

Example III

| | Parts by weight | Percent |
|---|---|---|
| Ingredients of composition after setting: | | |
| Cellulose ester | 1 | 3.5 |
| Limited solubility plasticizer | 10 | 34.5 |
| Filler | 12 | 41.3 |
| Volatile portion of composition: | | |
| Liquid solvents | 6 | 20.7 |
| | | 100.0 |

Example IV

| | Parts by weight | Percent |
|---|---|---|
| Ingredients of composition after setting: | | |
| Cellulose nitrate | 1 | 3.5 |
| Castor oil | 10 | 34.5 |
| Filler | 12 | 41.3 |
| Volatile portion of composition: | | |
| Toluol | 3 | 10.3 |
| Butyl acetate | 3 | 10.4 |
| | | 100.0 |

Example V

| | Per cent by weight |
|---|---|
| Cellulose nitrate | 4 |
| Acetone | 8.5 |
| Ethyl acetate | 10 |
| Butyl acetate | 2.5 |
| Amyl acetate | 1 |
| Castor oil | 30 |
| Filler (Asbestine) | 44 |
| | 100.0 |

Example VI

| | Per cent by weight |
|---|---|
| Cellulose nitrate | 4 |
| Castor oil | 30 |
| Filler (Asbestine) | 42 |
| Acetone | 4 |
| Ethyl acetate | 7.5 |
| Butyl acetate | 2.5 |
| Amyl acetate | 1 |
| Benzol | 5.5 |
| Toluol | 2.5 |
| Butyl alcohol | 1 |
| | 100.0 |

In use, the composition is applied to the surface of the extremities of the pipes, or other members to be joined, by means of a brush or swab. As explained, the composition is particularly adapted for sealing threaded joints, although it may be used on gaskets or other elements. When applied to threaded joints, a layer or coating of the composition is applied to the threads. The coating is sufficiently soft to permit the threaded joint to be made up and said composition acts as a lubricant to prevent injury to the joint due to frictional heat. After a period, the composition, which has filled the grooves formed by the threads, sets by evaporation of the lighter solvents to a soft pliable mass that is not mobile and will not flow of its own accord or under considerable pressure. The presence of the plasticizer or softener in the composition aids in preventing the drying of the composition beyond a given point so that the same cannot dry to hardness. The group of solvents, and the castor oil, in which the cellulose nitrate is dissolved, prevents the composition from drying completely. As explained hereinbefore the composition dries to a hardened but elastic state, which allows it to be distorted and prevents caking or chipping of the composition even under conditions of severe vibrations. Thus, the composition maintains a fluid and pressure-tight seal at the joint at all times and under all conditions.

As has been previously pointed out, the softener or plasticizer (castor oil) is admixed with the base solution in an amount which is in excess of the retentivity point of the cellulose nitrate. When the composition is applied to the joint and allowed to stand, the excess of the plasticizer slowly exudes from the compound and such exudation forms a thin film of said plasticizer, in this instance, castor oil, between the surface of the compound and the surface of the metal. This film or coating of the castor oil, which has high lubricating qualities, makes it possible to readily break or unscrew the joint, regardless of the length of time which said joint has been made up; also, the film of oil, acting as a lubricant, reduces friction and prevents injury to the threads by frictional heat.

The composition has been found particularly adaptable for use in the petroleum industry as it is substantially unaffected by dilute acids, gas, gasoline or other petroleum hydrocarbons; it is also waterproof and is capable of withstanding high pressure, as well as high temperatures. Although it has been used satisfactorily in the petroleum industry for sealing threaded joints, metal tank joints, and other contacting metallic surfaces, it may be used elsewhere. The constituents in the composition are insoluble in water, as well as insoluble in petroleum, as above explained, and thereby form an effective sealing composition for water lines.

This composition may also be made from cellulose ethers, such as ethyl cellulose or butyl cellulose. The composition made from these ingredients is very similar in every detail to the composition described hereinbefore. In place of the castor oil, a partially solvent softener, such as butyl stearate, is used.

Examples of this form of the invention follow:

Example VII

| | Parts by weight | Percent |
|---|---|---|
| Ingredients of composition after setting: | | |
| Cellulose ether | 2 | 5.7 |
| Limited solubility softener | 10 | 27.7 |
| Filler | 12 | 33.3 |
| Volatile portion of composition: | | |
| Aromatic hydrocarbons and aliphatic alcohols | 12 | 33.3 |
| | | 100.0 |

Example VIII

| | Parts by weight | Percent |
|---|---|---|
| Ingredients of composition after setting: | | |
| Ethyl cellulose | 2 | 5.7 |
| Butyl stearate | 10 | 27.7 |
| Filler | 12 | 33.3 |
| Volatile portion of composition: | | |
| Ethyl alcohol | 2 | 5.6 |
| Toluol | 10 | 27.7 |
| | | 100.0 |

Butyl stearate is compatible with ethyl or butyl cellulose in limited quantities, such as castor oil is in nitrocellulose. Thus, the excess of butyl stearate will exude from the composition after it has set.

Another example is:

Example IX

| | Parts by weight | Percent |
|---|---|---|
| Ingredients of composition after setting: | | |
| Ethyl cellulose | 2 | 3.4 |
| Butyl stearate | 20 | 34.0 |
| Filler | 25 | 42.2 |
| Volatile portion of composition: | | |
| Ethyl alcohol | 2 | 3.4 |
| Toluol | 10 | 17.0 |
| | | 100.0 |

Although it is desirable to form the base solution by dissolving the cellulose derivative in a group of solvents, as above explained, it would be possible to produce the composition in another manner. In place of the base solution as formed above, commercial pyroxylin cement, which may be purchased on the open market, may be employed. There are various types of commercial pyroxylin cement on the market, but such cement consists of pyroxylin, which is a nitrocellulose; a solvent, such as ester, alcohol or ketone; a non-solvent, such as benzene, xylene, or toluene; a resin, such as shellac; and a plasticizer, such as an ester or ketone having a very high boiling point. The various types of pyroxylin cements offered for sale on the open market may have the proportion of the substances thereof varied slightly, whereby slight variations in viscosity and other conditions of the cement may occur in such various commercial products. Also some of the cements may not include the exact substances outlined above, and it is pointed out that any pyroxylin cement may be employed, provided it has the necessary characteristics outlined hereinbefore.

In forming the mixture, the pyroxylin cement is admixed with a plasticizer and filler mixture to form the sealing composition. The plasticizer described above, namely; castor oil and a suitable mineral filler, such as "asbestine," may be used. The proportions are such that the composition has a consistency substantially that of molasses, whereby said composition may be readily applied to the surface to be sealed with a brush or swab. This composition has all of the qualities of the first composition described herein and provides a fluid and pressure-tight seal.

What we claim and desire to secure by Letters Patent is:

1. A sealing composition including, a cellulose ether in physical solution in a liquid solvent, a plasticizer physically soluble in the ether in limited proportions dissolved in the ether solution in excess of its solubility in the ether, whereby when the liquid solvent evaporates, the excess of the plasticizer will separate from the ether and form a film of plasticizer upon the mass of the composition, while the balance of the plasticizer will remain intimately associated with the ether and maintain the mass of the composition in a plastic condition.

2. A sealing composition including, ethyl cellulose in physical solution in a liquid solvent, a plasticizer physically soluble in the ethyl cellulose in limited proportions dissolved in the ethyl cellulose solution in excess of its solubility in the ethyl cellulose, whereby when the liquid solvent evaporates, the excess of the plasticizer will separate from the ethyl cellulose and form a film of plasticizer upon the mass of the composition, while the balance of the plasticizer will remain intimately associated with the ethyl cellulose and maintain the mass of the composition in a plastic condition.

3. A sealing composition including, a cellulose ester in physical solution in a liquid solvent, a plasticizer physically soluble in the ester in limited proportions dissolved in the ester solution in excess of its solubility in the ester and in excess of the ratio of 5 to 1 relative to said ester whereby when the liquid solvent evaporates, the excess of the plasticizer will separate from the ester and form a film of plasticizer upon the mass of the composition, while the balance of the plasticizer will remain intimately associated with the ester and maintain the mass of the composition in a plastic condition.

4. A sealing composition including, a cellulose ester in physical solution in a liquid solvent, castor oil physically dissolved in the ester solution in excess of the retentivity of the ester for the castor oil, whereby when the liquid solvent evaporates, the excess of the castor oil will separate from the ester and form a lubricating film of castor oil upon the mass of the composition, while the balance of the castor oil will remain intimately associated with the ester and maintain the mass of the composition in a plastic condition.

5. A sealing composition including, a cellulose ether in physical solution in a liquid solvent, butyl stearate physically dissolved in the ether solution in excess of the retentivity of the ether for the butyl stearate, whereby when the liquid solvent evaporates, the excess of the butyl stearate will separate from the ether and form a lubricating film of butyl stearate upon the mass of the composition, while the balance of the butyl stearate will remain intimately associated with the ether and maintain the mass of the composition in a plastic condition.

6. A sealing composition as set forth in claim 4 wherein the castor oil is present in the composition in excess of the ratio of 5 to 1 with respect to the cellulose ester.

7. A sealing composition including a mixture of the following ingredients in the approximate proportions stated:

| | Per cent |
|---|---|
| Cellulose ester | 5.7 |
| Limited solubility plasticizer | 27.7 |
| Filler | 33.3 |
| Liquid solvent | 33.3 |

8. A sealing composition including a mixture of the following ingredients in the approximate proportions stated:

| | Parts by weight | Percent |
|---|---|---|
| Cellulose nitrate | 1 | 5.7 |
| Castor oil | 5 | 27.7 |
| Filler | 6 | 33.3 |
| Ethyl acetate | 6 | 33.3 |

9. A sealing composition including a mixture of the following ingredients in the approximate proportions stated:

| | Parts by weight | Percent |
|---|---|---|
| Cellulose nitrate | 1 | 3.5 |
| Castor oil | 10 | 34.5 |
| Filler | 12 | 41.3 |
| Toluol | 3 | 10.3 |
| Butyl acetate | 3 | 10.4 |

10. A sealing composition including a mixture of the following ingredients in the approximate proportions stated:

| | Parts by weight | Percent |
|---|---|---|
| Ethyl cellulose | 2 | 5.7 |
| Butyl stearate | 10 | 27.7 |
| Filler | 12 | 33.3 |
| Ethyl alcohol | 2 | 5.6 |
| Toluol | 10 | 27.7 |

11. A sealing composition including a mixture of the following ingredients in the approximate proportions stated:

| | Percent by weight |
|---|---|
| Cellulose nitrate | 4 |
| Acetone | 8.5 |
| Ethyl acetate | 10 |
| Butyl acetate | 2.5 |
| Amyl acetate | 1 |
| Castor oil | 30 |
| Filler (Asbestine) | 44 |

12. A sealing composition including, a cellulose derivative selected from the group consisting of cellulose esters and cellulose ethers in physical solution in a liquid solvent, butyl stearate physically dissolved in the derivative solution in excess of the retentivity of the derivative for the butyl stearate, whereby when the liquid solvent evaporates, the excess of the butyl stearate will seaprate from the derivative and form a lubricating film of butyl stearate upon the mass of the composition, while the balance of the butyl stearate will remain intimately associated with the derivative and maintain the mass of the composition in a plastic condition.

13. A sealing composition including, a cellulose derivative selected from the group consisting of cellulose esters and cellulose ethers in physical solution in a liquid solvent, a plasticizer physically soluble in the derivative in limited proportions dissolved in the derivative solution in excess of its solubility in the derivative, said plasticizer being present in amounts at least five times the amount of the derivative whereby when the liquid solvent evaporates, the excess of the plasticizer will separate from the derivative and form a film of plasticizer upon the mass of the composition, while the balance of the plasticizer will remain intimately associated with the derivative and maintain the mass of the composition in a plastic condition.

14. A sealing composition including, a cellulose derivative selected from the group consisting of cellulose esters and cellulose ethers in physical solution in a liquid solvent, a plasticizer physically soluble in the derivative in limited proportions dissolved in the derivative solution in excess of its solubility in the derivative and being in excess of the ratio of 5 to 1 with respect to said derivative, whereby the excess of the plasticizer will separate from the derivative and form a film of plasticizer upon the mass of the composition and the balance of the plasticizer will remain intimately associated with the derivative and maintain the mass of the composition in a plastic condition upon evaporation of the liquid solvent.

LAURENCE L. RECTOR.
CHARLES L. CRON.